June 15, 1965  L. H. LEONARD, JR  3,188,832
PORTABLE REFRIGERATION AND WATER PURIFYING APPARATUS
Filed Jan. 28, 1963
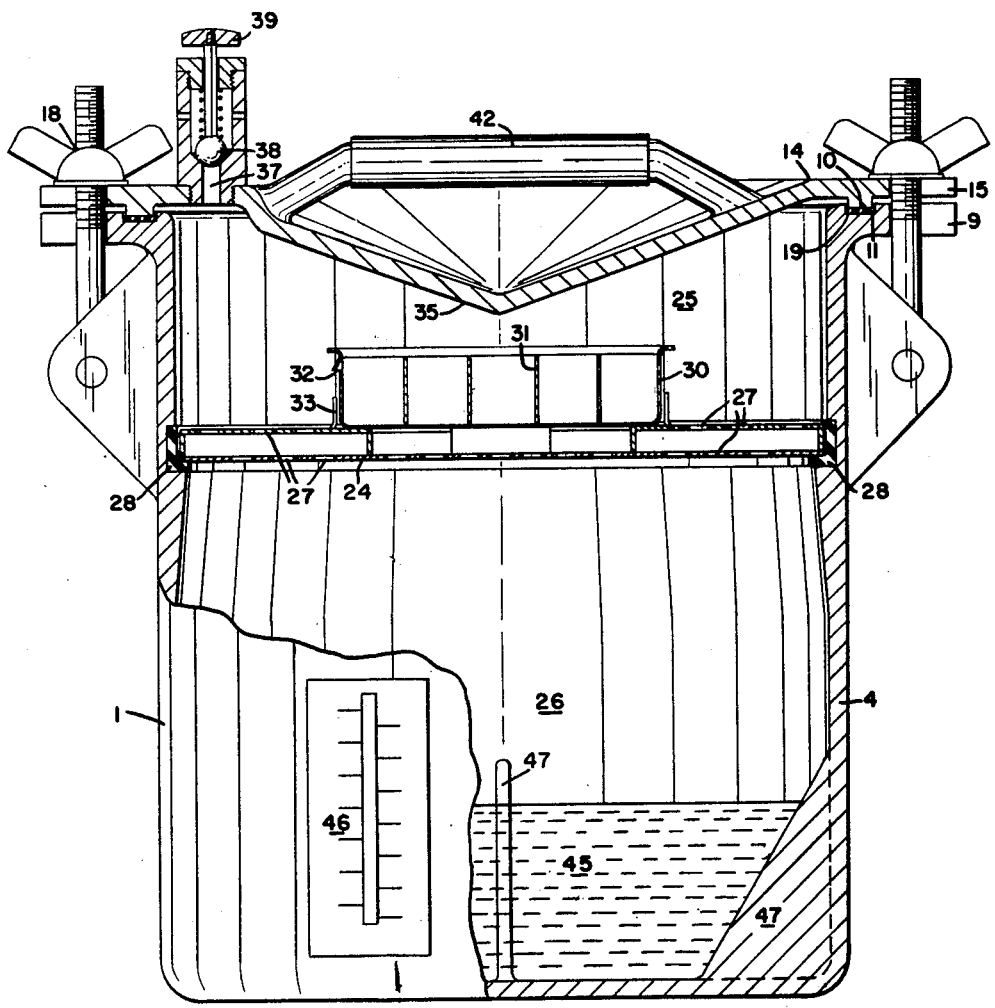
INVENTOR.
LOUIS H. LEONARD, JR.
BY
ATTORNEY.

3,188,832
PORTABLE REFRIGERATION AND WATER PURIFYING APPARATUS

Louis H. Leonard, Jr., De Witt, N.Y., assignor to Carrier Corporation, Syracuse, N.Y., a corporation of Delaware
Filed Jan. 28, 1963, Ser. No. 254,392
7 Claims. (Cl. 62—478)

This invention relates to a refrigeration apparatus, and more particularly to a method and apparatus for making ice and purifying water.

It may be desirable, particularly during periods of emergency or in remote areas, to have apparatus, preferably self-contained and portable, to make ice. Since sources of power such as electricity or gas may be unavailable, as during an emergency or when in a remote area, the ice making apparatus should preferably be operable by a source of power that normally is readily available at all times. Further, the ice making apparatus should be able to preserve the ice product for an extended period, and be reusable, requiring only replacement of water previously used.

Water needed for human consumption may be impure or of doubtful purity, particularly during periods of emergency or in remote areas where the water supply may be an untreated local source. In this situation, a simple, portable, self-contained, reusable apparatus for effectively and reliably rendering water safe for human intake is of extreme importance.

With these considerations in mind, it is a principal object of the present invention to provide an improved apparatus and method for making ice and purifying water.

It is a further object of the present invention to provide a simple, inexpensive ice maker and water purifier requiring little skill to operate, and of light weight, unitary construction readily adapted for use in remote areas or outer space, or during periods of emergency.

It is a further object of this invention to provide a portable self-contained refrigeration device of the absorption type for making ice and purifying water operable to efficiently purge the system of noncondensibles and contaminants during the refrigeration cycle.

It is an additional object of the present invention to provide a portable self-contained ice making apparatus devoid of moving parts and powered by a source of heat.

It is a further object of the present invention to provide a portable device operable, when heated to a determined temperature and thereafter cooled, to make ice, and to efficiently preserve ice made for extended periods. These and other objects will become more apparent from the ensuing description.

This invention relates to a portable refrigeration apparatus for making ice and purifying water including a vessel, a first compartment in the vessel adapted to contain an absorbent and to receive water to form a water-absorbent solution, the water being adapted to vaporize in response to the application of heat to the solution, a second compartment in the vessel communicating with the first compartment, baffle means between the first and second compartments adapted to confine the absorbent to the first compartment, means in the second compartment adapted to condense water vapor, condensate collecting means in the second compartment communicating with the condensing means, and means adapted in respose to a predetermined vessel pressure to remove noncondensibles from the vessel, the last-mentioned means sealing the vessel upon a reduction in the predetermined vessel pressure so that a portion of the condensate in the collecting means vaporizes to form ice from the remaining condensate in the collecting means, the absorbent being adapted to absorb the condensate vapor.

The invention further relates to a method of making ice and purifying water in a portable vessel containing a water absorbent solution and an ice tray spaced from the solution, the steps which consist in heating the solution to vaporize a portion of the water, maintaining a predetermined pressure in the vessel, condensing water vapor in the ice tray while expelling noncondensibles from the vessel, reducing the predetermined vessel pressure to vaporize a portion of the condensate in the ice tray to freeze the remaining condensate in the ice tray, and absorbing the condensate vapor by the absorbent.

The attached drawing illustrates a preferred embodiment of the invention in which the figure is a side elevation partly in section of the refrigerating and water purifying apparatus of the present invention.

Referring to the drawing, numeral 1 designates applicant's portable refrigeration unit and emergency water purifier. The refrigeration unit and emergency water purifier 1 includes an open container or receptacle 4. The upper edges of container 4 may be formed to provide horizontally disposed seat 9 adapted to support cover 14. The outer edge portion 15 of cover 14 and container seat 9 may be provided with a cooperating tongue and groove locating means 10, 19 respectively to aid in positioning cover 14 relative to container 4. A sealing means 11 may be provided in groove 19 of seat 9. Releasable fastening means 18 may be provided to tightly fasten cover 14 to container 4.

It is appreciated that container 4 may be open at the side rather than the top as shown. The container 4 and the cover 14 would accordingly be suitably modified to permit attachment of the cover to the container side. Further, fastening means other than that illustrated at 18 may be contemplated. Alternately, cover 14 may be hingedly attached to container 4.

Baffle 24, fixedly positioned in container 4, separates container 4 into upper and lower compartments 25, 26 respectively. Suitable thermal insulating means 28 may be provided between baffle 24 and container 4. A plurality of openings 27 in baffle 24 communicate upper compartment 25 with lower compartment 26. Baffle 24 functions as an eliminator to prevent the passage of absorbent into the upper compartment 25 during the refrigeration process.

Upper compartment 25 includes a removable receptacle 30 adapted, during the refrigeration cycle, to retain a predetermined amount of condensate in a manner to be more fully described hereinafter. Receptacle 30, shown in the form of an ice tray having a plurality of cube defining means 31, includes liquid level limiting means 32 and preferably rests on baffle 24. A tray locating means 33, fixedly attached to baffle 24, may be provided therefor. It is understood that receptacle 30 may be of any desired shape or configuration either with or without cube defining means. Further, receptacle 30 may be supported in upper compartment 25 by means other than baffle 24.

A condensing means in the form of a depression 35 in cover 14 is provided in upper compartment 25. Condensing means 35 is positioned over tray 30 so that condensate formed thereon may pass into tray 30. While condensing means 35 is illustrated as a depression in the cover 14, other suitable designs may be contemplated. Alternately, condensing means separate from cover 14 and suitably positioned in upper compartment 30 in operative relationship to tray 30 may be provided.

Cover 14 includes a vent 37 adapted to communicate container 4 with the atmosphere. Vent 37 is regulated by a normally closed pressure responsive valve 38. In a manner to be more fully explained, valve 38, in response to a predetermined pressure in container 4, opens vent 37 to communicate the container with the atmosphere.

Valve 38 includes an operator 39 by means of which valve 38 may be manually actuated to selectively communicate compartment 25 with the atmosphere. A handle 42 may be fixedly attached to cover 14.

A temperature indicating means 46 having a temperature responsive element in lower compartment 26 may be suitably mounted on the exterior of container 4. Temperature indicating means 46 serves to indicate temperatures occurring in lower compartment 26. One or more agitation baffles 47 may be provided in the lower compartment 26.

Lower compartment 26 is adapted to contain an absorbent solution 45 which may comprise a mixture of lithium bromide and water. Other absorbent solutions such as lithium chloride and water may be contemplated. A quantity of fibrous material (not shown), for example, stainless steel wool, may be placed in lower compartment 26 in contact with the absorbent solution 45 to improve heat transfer thereof and prevent liquid slugging.

To operate applicant's unique refrigeration unit to make ice or purify water, a suitable amount of water, which may be contaminated, is added to the absorbent solution 45 in container 4. The amount of water added is preferably in excess of that required to fill tray 30 since a portion of the water added is passed to the atmosphere during operation of the unit to remove noncondensibles. Tray 30, now empty, is suitably positioned in upper compartment 25 on baffle 24. Container 4 is then tightly closed by securing cover 14 thereto by fastening means 18.

Heat may then be applied to the lower portion of closed container 4. Any convenient source of heat may be utilized, for example, a campfire into or over which the unit 1 may be placed. The application of heat to the lower portion of closed container 4 raises the temperature of the water-absorbent mixture in lower compartment 26 and increases pressure within the closed container. At a predetermined container pressure, regulating valve 38 opens vent 37 to communicate container 4 with the atmosphere. The increased temperature of the water-absorbent mixture in lower compartment 26 vaporizes a portion of the water which passes into upper compartment 25 through openings 27 in baffle 24. Therein, condensing means 35 condenses a portion of the water vapor into liquid, the liquid condensate thereafter passing from condensing means 35 into tray 30 to preferably fill the same to a preset level as determined by level limiting means 32. Excess liquid condensate passes through level limiting means 32 to return to lower compartment 26, the condensate passing through openings 27 in the absorbent elimination baffle 24 into compartment 26 wherein it may be revaporized. It is noted that condensing means 35, which is remote from the source of heat applied to the lower portion of container 4 and in contact with the atmosphere, is maintained at a lower temperature than that of the water-absorbent mixture in lower compartment 26. Where condensing means 35 is in the form of a depression in cover 14, the depression may be filled with water to promote the condensing process.

A portion of the vaporized water entering upper compartment 25 including noncondensibles, for example, air, passes through vent 37, now open, into the atmosphere. In this manner, excess water over and above that required to fill tray 30 to the preset level is used to remove noncondensibles from the vessel into the atmosphere. The application of heat to the lower portion of container 4 is continued until the temperature indicating means 46 registers a predetermined lower compartment temperature corresponding to a determined absorbent solution concentration. Heating to a specific predetermined temperature, which depends upon the particular solution properties, assures adequate solution concentration for the production of ice and effective purging of noncondensibles from the system. The container 4 may be then removed from the source of heat and the unit allowed to cool. The cooling process may, if desired, be speeded up by artificial means, as for example, by immersing the unit in water.

As the refrigerating unit 1 cools, both temperature and pressure therein decrease. At the predetermined pressure, regulating valve 38 closes vent 37 interrupting communication of the container 4 with the atmosphere. Closure of vent 37 seals container 4 so that a further decrease in pressure establishes a vacuum condition therein. The reduction of pressure in sealed container 4 vaporizes or flash cools a portion of the water in tray 30. The resultant vapor is absorbed by the absorbent solution 45 to effect a heat exchange between the water in tray 30 and the absorbent solution in lower compartment 26. The extraction of the heat of vaporization and fusion from the water in tray 30 through the absorption of water vapor by the absorbent solution 45 freezes the remaining water in tray 30 to form ice. If desired, the freezing process may be aided by using baffles 47 to agitate the absorption solution 45. This may be done through the physical movement of the unit 1 such as by rotating the container back and forth.

The freezing of the water in tray 30 completes the cycle and the unit 1 may be then opened to remove the tray of ice. Since the cooling process reduces pressure in sealed container 4 below atmospheric regulating valve 38 may be manually actuated by means of valve operator 39 to open vent 37 to communicate container 4 with the atmosphere to neutralize the vacuum therein. Fastening means 18 may be released and cover 14 removed to gain access to the ice.

The evacuation of container 4 during the cooling portion of the refrigeration cycle results in a tightly sealed compartment capable of preserving the ice formed in tray 30 for an extended period of time. If the ice formed is not required at the completion of the cooling cycle, the unit may be left unopened to store the ice until needed.

The germicidal and odor absorbing properties of absorbent solutions, for example, lithium bromide, are appreciated. If the water added to the absorbent solution 45 is contaminated or impure, mixture thereof with the absorbent solution and the subsequent vaporization and condensation of a portion thereof in tray 30 results in potable water fit for human consumption. To obtain drinking water, the ice formed by applicant's unique portable refrigeration unit and emergency water purifier need only be melted.

It is appreciated that the absorbent solution 45 is reusable since the solid, water soluble absorbent salt cannot be lost by vaporization. Thus, to make additional ice or purify additional contaminated or impure water, it is only necessary to add water, either pure or contaminated, to the unit 1 in the manner described heretofore.

While I have described a preferred embodiment of my invention, it will be understood that my invention is not limited thereto, since it may otherwise be embodied within the scope of the following claims.

I claim:

1. In portable refrigeration apparatus, the combination of a vessel adapted to contain a water-absorbent solution, a portion of said water being adapted to vaporize upon heating of the solution, means adapted to condense the water vapor, condensate collecting means in said vessel spaced from said solution, said condensate collecting means being capable of being removed from said vessel, and means for removing noncondensibles from said vessel, a portion of the condensate in said collecting means in response to a reduction in pressure in said vessel caused by cooling of said vessel vaporizing to form ice in said collecting means from the remaining condensate, said absorbent absorbing said last-mentioned vapor.

2. Portable refrigeration apparatus according to claim 1 in which said vessel includes baffle means adapted to prevent the passage of absorbent into said condensate collecting means.

3. Portable refrigeration apparatus according to claim 2 in which said means for removing noncondensibles includes passage means operable in response to a predetermined vessel pressure to communicate said vessel with the atmosphere.

4. In portable refrigeration apparatus, the combination of a vessel, a first compartment in said vessel adapted to contain an absorbent and to receive water to form a water-absorbent solution, said water being adapted to vaporize in response to the application of heat to said solution, a second compartment in said vessel communicating with said first compartment, baffle means between said first and second compartments adapted to confine said absorbent to said first compartment, means in said second compartment adapted to condense water vapor, condensate collecting means in said second compartment in communication with said condensing means, said condensate collecting means being capable of being removed from said vessel, and means adapted in response to predetermined vessel pressure to remove noncondensibles from said apparatus, said last-mentioned means sealing said vessel upon a change in said predetermined vessel pressure so that a portion of said condensate vaporizes to form ice in said collecting means from remaining condensate, said absorbent being adapted to absorb said last-mentioned vapor.

5. Portable refrigeration apparatus according to claim 4 in which said first compartment includes means for agitating said absorbent.

6. Portable refrigeration apparatus according to claim 5 in which said first compartment includes means operable to register first compartment temperature.

7. Portable refrigeration apparatus according to claim 4 in which said vessel includes releasable means for opening said vessel.

References Cited by the Examiner
UNITED STATES PATENTS

| | | | |
|---|---|---|---|
| 1,513,172 | 10/24 | Hill | 62—85 |
| 1,564,705 | 12/25 | Odell et al. | 62—480 X |
| 1,671,531 | 5/28 | Kuhl | 62—478 X |
| 1,729,083 | 9/29 | Miller et al. | 62—179 |
| 1,740,737 | 12/29 | Keith | 62—478 X |
| 1,793,287 | 2/31 | Keith | 62—478 X |
| 1,915,276 | 6/33 | Glass | 62—478 X |
| 2,053,683 | 9/36 | Schlumbohm | 62—478 X |
| 2,929,230 | 3/60 | Schmerzler | 62—478 |
| 3,146,602 | 9/64 | Swearingen | 62—85 |

ROBERT A. O'LEARY, *Primary Examiner.*